May 28, 1935.  O. MITCHELL  2,003,262

SAW CYLINDER FOR COTTON EXTRACTING MACHINES

Filed May 19, 1934

INVENTOR
ORVILLE MITCHELL

BY Bruce S. Elliott
ATTORNEY.

Patented May 28, 1935

2,003,262

UNITED STATES PATENT OFFICE 2,003,262

SAW CYLINDER FOR COTTON EXTRACTING MACHINES

Orville Mitchell, Dallas, Tex.

Application May 19, 1934, Serial No. 726,437

2 Claims. (Cl. 19—63)

The general object of this invention is to provide an all-metal cotton extracting saw cylinder with the purpose in view of obviating various disadvantages incident to the use of such saw cylinders as now generally constructed.

The type of saw cylinder heretofore generally used in cotton-extracting machinery has either been made up of wooden drums with saw bands nailed around the periphery of the drum, or with wooden staves extending lengthwise of the drum and covered with sheet metal, and having the saw bands placed around the drum formed by the sheet metal, and secured in place by nails driven through the sheet metal and into the wooden staves.

Such saw cylinders have met the requirements of operation with a fair degree of satisfaction, although wood capable of holding nails often splits, especially when the saw bands are nailed on the second time, or even oftener, which is frequently necessary in replacing saw bands that are damaged by hard foreign substances passing into the extracting machinery with the cotton. This, however, constituted a more or less minor objection which, to a large extent could be obviated by selecting the proper character of wood for constructing the cylinders.

In recent years, however, a novel method of drying and conditioning cotton has come into extensive commercial use, in practice of which currents of air at a high temperature are forced through the cotton extracting machinery. The presence of this heated air in the machine causes the wood of the saw cylinders to shrink, the nails securing the saw bands of the cylinder become loose, and the saw bands fall off. This constitutes a serious disadvantage, and one which it has been found practically impossible to avoid with the use of any character of wood.

Furthermore, as the shrinkage of the wood is not uniform, the saw cylinders become more or less distorted in shape, causing them to be thrown out of balance, and producing excessive vibration in operation.

To obviate the above and other difficulties incident to the use of wood in the construction of extractor saw cylinders, I construct the cylinder of sheet-metal parts, and employ aeroplane, or hardened self-threading screws for securing the saw bands to the cylinder. My improved construction to be later described in detail, not only makes practicable the use of an all-metal construction of extracting cylinder, but facilitates changing or replacing any individual saw band which might become damaged by reason of hard substances getting into the machine, as heretofore mentioned.

The invention is illustrated in the accompanying drawing, in which.

Figure 1:
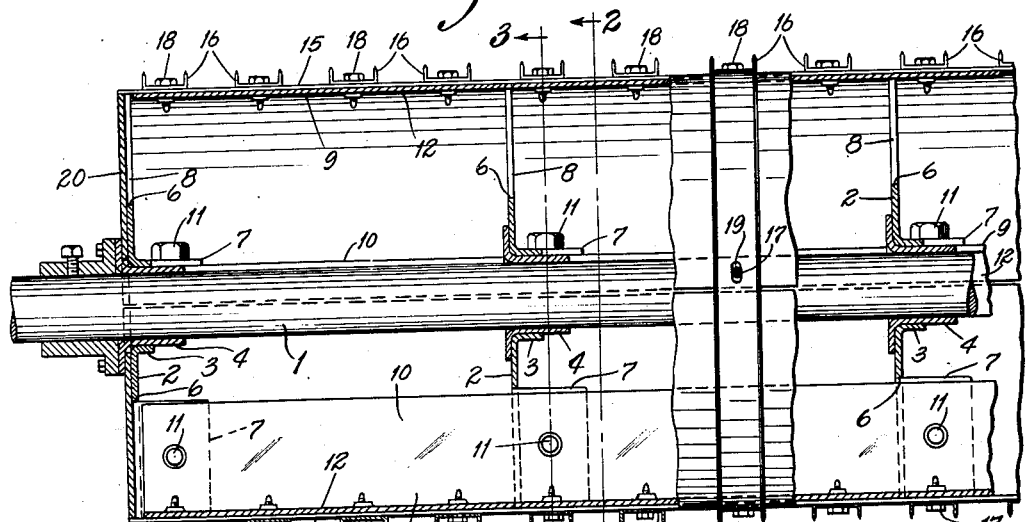
Figure 1 is a longitudinal sectional view through one end portion of a saw cylinder constructed according to my invention.
Figure 2:
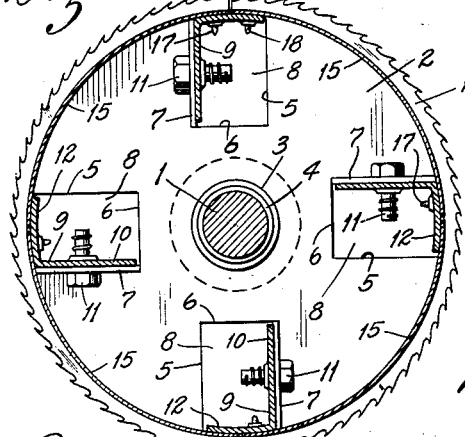
Figure 2 is a cross-sectional view taken on the line 2—2 of Figure 1.

Referring now to the drawing, the numeral 1 indicates a central shaft on which, at equally spaced intervals, I mount a plurality of disks, 2, for supporting the outer longitudinal members forming the periphery of the drum. Preferably, these disks are secured to the shaft by having the metal surrounding the central aperture therein turned outward to form a supporting flange, 3, and the face of the disk and this flange is then welded to a pressed-metal hub, 4, which in turn is either welded or bolted to the shaft.

An important feature of the invention resides in the construction and means which I employ for forming peripheral supports for an outer shell or covering, and which at the same time provide means for enabling the saw bands to be secured on the cylinder.

Figure 3:
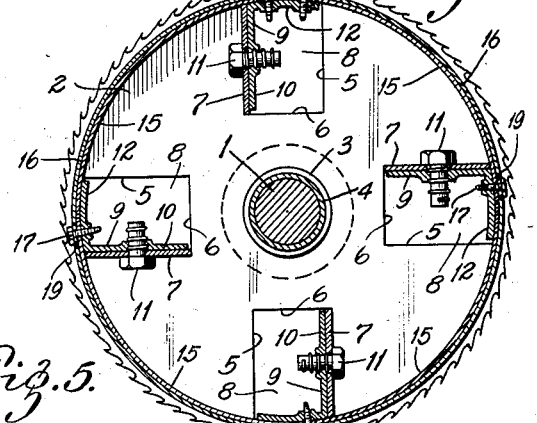
Figure 3 is a similar view taken on the line 3—3 of Figure 1.
Figure 5:
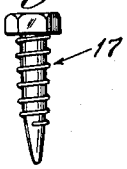
Figure 5 is a view of one of the self-threading screws employed for securing the saw bands in place.
Figure 4:
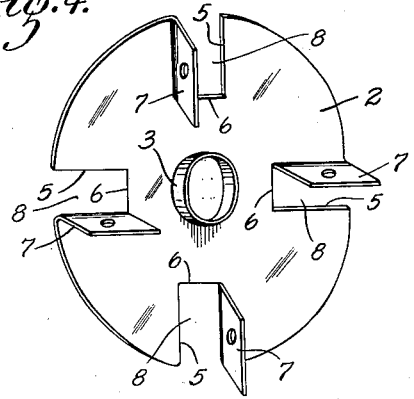
Figure 4 is a perspective view of one of a plurality of disks constituting the main frame or body of the cylinder.

To this end each of the disks 2 is cut on lines extending parallel with a diametrical line of the disk at preferably four points around the periphery of the disk, as indicated at 5, in Figure 3, the length of each cut being preferably about one-half the length of the radius of the disk. The metal is next cut at right angles to the cut 5, as indicated at 6, in a direction to cross a radius of the disk, the cut 6 being somewhat less in length than the cut 5. The metal bounded by the two cuts is then bent back at right angles to the face of the disk to form lips 7, and providing rectangular recesses, 8, extending, of course, from the cut 6 to the periphery of the disk. The disks are so mounted on the shaft that all the corresponding recesses 8 of the respective disks will be in alignment with each other. Mounted within each series of recesses 8 is a longitudinal angle-support, 9, which extends the full length of the cylinder. Each of these supports comprises a straight, flat-metal bar, 10, which extends parallel to and in contact with the series of lips 7, and which is secured thereto either by welding, or, as shown, by means of screws, 11, passed through an aperture in each lip and a corresponding aperture in the bar 10. At its outer end each bar 10 is bent at right angles on a curved line, corresponding to the curvature of the periphery of the disk, to form a peripheral support, 12, which extends across and closes the outer ends of the line of recesses 8, these supports providing a true round skeleton support for a sheet metal housing which completes the cylinder.

Three of the peripheral supporting members 12 of each disk are provided with a line of apertures, 13, spaced a suitable distance apart, while the fourth supporting member, shown at the top of Figure 3, is provided with an additional line of apertures, as indicated at 14; the apertures 13 and 14 of this member being positioned, respectively, on opposite sides of the longitudinal center of the member.

The sheet metal housing, 15, is preferably made in sections, and, to complete the drum, these curved members are first placed around the disks and supporting members and temporarily held in position until channelled saw bands, 16, are placed around the housing at intervals throughout the length of the cylinder and secured in place. The saw bands are thus secured by means of self-threading screws, 17, driven into the aperture 13 through openings in the saw bands, and, where the ends of the saw bands come together, as shown at the top of Figure 3, by an additional line of self-threading screws, 18.

The openings, 19, in the base or channel of the saw bands through which the self-threading screws 17 and 18 pass are elongated in shape, as indicated in Figure 1, and are practically the same size as the screws in the direction transversely of the saw bands, so that if there should be any slight inaccuracy or variation in diameter of the drum, some portion of the openings through the saw bands will always come over the comparatively small apertures through the curved supporting members 13, thus obviating any difficulty in driving the self-threading screws into the apertures 13 and 14 and holding the saw bands in place.

As shown by Figure 1, as to one end of the cylinder, each end of the cylinder may be closed, that is, the recesses 8 in the end disks covered, by welding on to each end disk a separate solid disk, 20.

Figure 6:
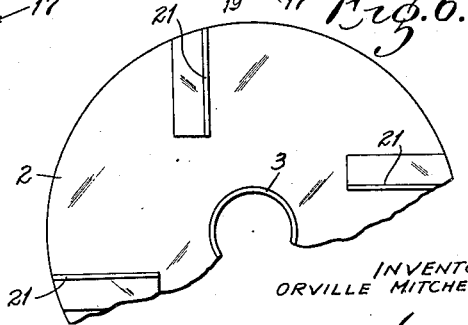
Figure 6 is a view of a portion of one of the two end disks of the cylinder illustrating a modification in the manner of providing closed ends for the cylinder.

If preferred, and as shown in the modified construction illustrated by Figure 6, the recesses 8 will be omitted from the end disks and lips, 21, corresponding to the lips 7, be welded to the inner face of each disk at four points around the periphery thereof. A cylinder employing this modified construction will have the advantage of being somewhat lighter in weight than a cylinder employing the two solid metal disks at the ends, as illustrated in Figure 1.

The use of aeroplane, or hard metal self-threading screws is, to a large extent a deciding factor in rendering possible the use of an all-metal cotton extracting cylinder. That is to say, when the saw bands have been secured in place by forcing these screws into the apertures of the curved supporting members, there is no danger whatever of the saw bands becoming loose, or falling off, as these screws will hold fast under almost any conditions of service. At the same time, they may be removed to enable damaged saw bands to be replaced with new bands.

I claim:

1. A saw cylinder for cotton extracting machines comprising, in combination, a shaft, a series of disks secured thereon in spaced relation, each of said disks being provided with equally spaced, circumferential radial recesses, corresponding recesses of the respective disks aligning, lips projecting, respectively, at right angles from corresponding sides of said recesses, an angle bar mounted in each aligning series of recesses, each angle bar extending the full length of the cylinder and comprising a straight flat metal member secured to the lips of its line of recesses and having an integral curved supporting member extending across the outer ends of said recesses, a sheet metal housing surrounding and supported on said disks and supporting members, and a series of saw bands encircling said housing at intervals throughout the length of the cylinder and secured in position by screws passed through apertures in the saw bands and engaged in said supporting members.

2. A saw cylinder for cotton extracting machines comprising, in combination, a shaft, a series of disks secured thereon in spaced relation, each of said disks being provided with equally-spaced, circumferential, radial recesses, corresponding recesses of the respective disks aligning, and the metal at one side of each recess being bent outward at right angles to form a lip, an angle-bar mounted in each aligning series of recesses, each angle bar extending the full length of the cylinder, and comprising a straight, flat metal member secured to the lips of a line of recesses and having an integral curved supporting member extending across the outer ends of the recesses, a sheet metal housing surrounding and supported on said disks and supporting members, and a series of saw bands encircling said housing at intervals throughout the length of the cylinder and secured in position by screws passed through apertures in the saw bands and engaged in said supporting members.

ORVILLE MITCHELL.